Oct. 16, 1951  D. BELCHER ET AL  2,571,103
BAG SEALING MACHINE

Filed Oct. 29, 1948  6 Sheets-Sheet 1

INVENTORS
DANIEL BELCHER
BY HAROLD V. KINDSETH

Paul, Paul & Moore
ATTORNEYS

Oct. 16, 1951  D. BELCHER ET AL  2,571,103
BAG SEALING MACHINE
Filed Oct. 29, 1948  6 Sheets-Sheet 2

INVENTORS
DANIEL BELCHER
BY HAROLD V. KINDSETH

Paul, Paul & Moore
ATTORNEYS

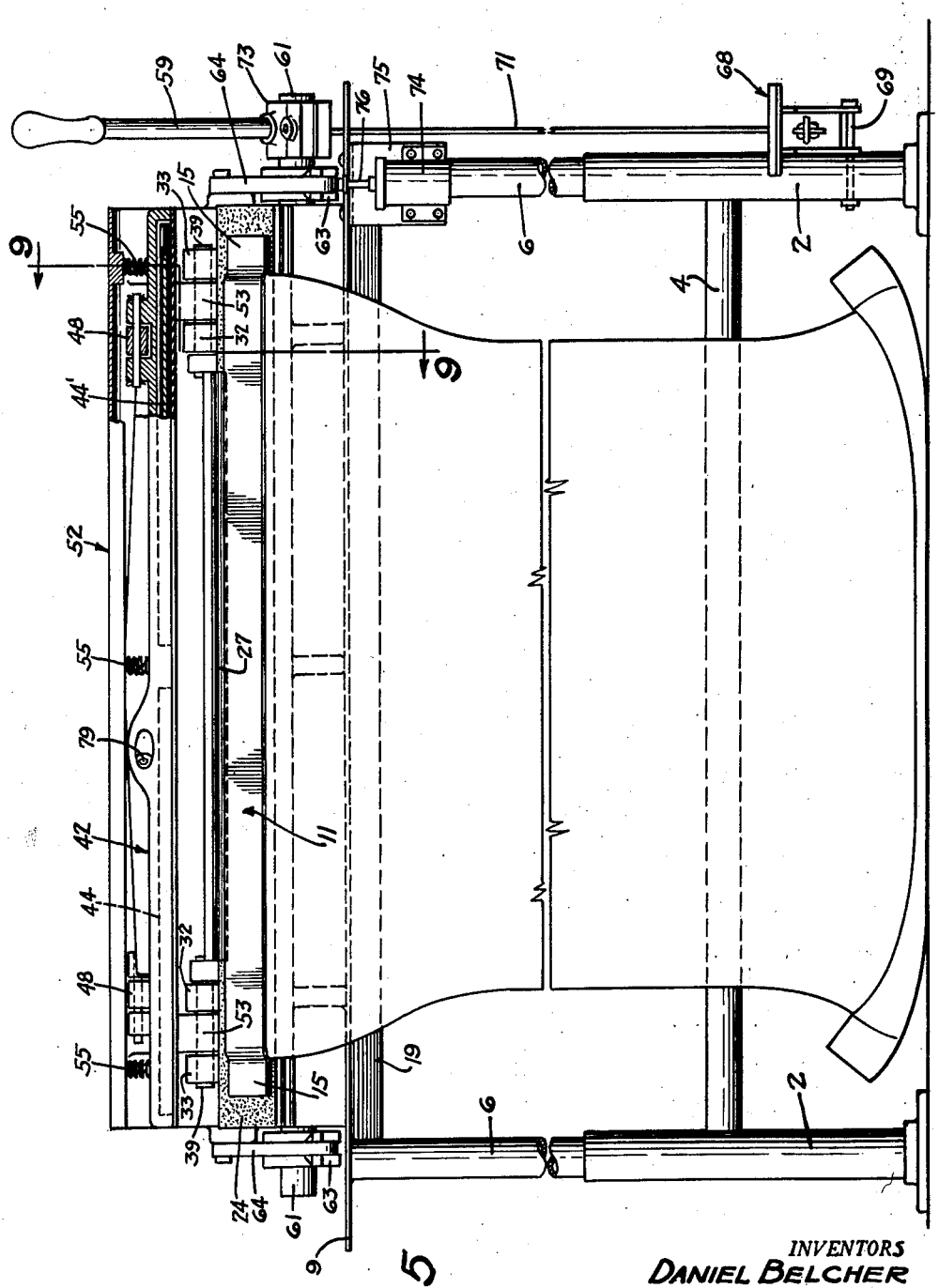

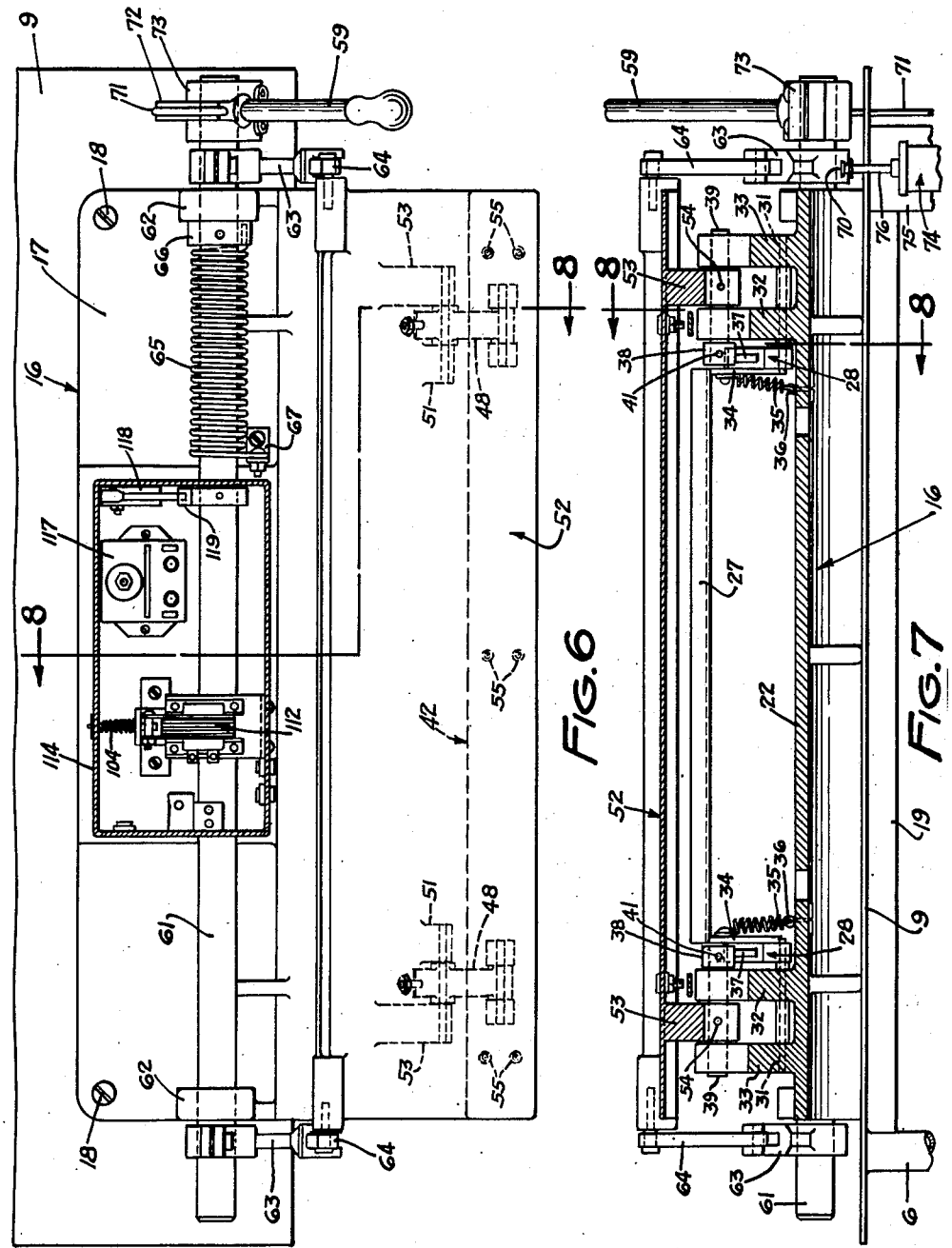

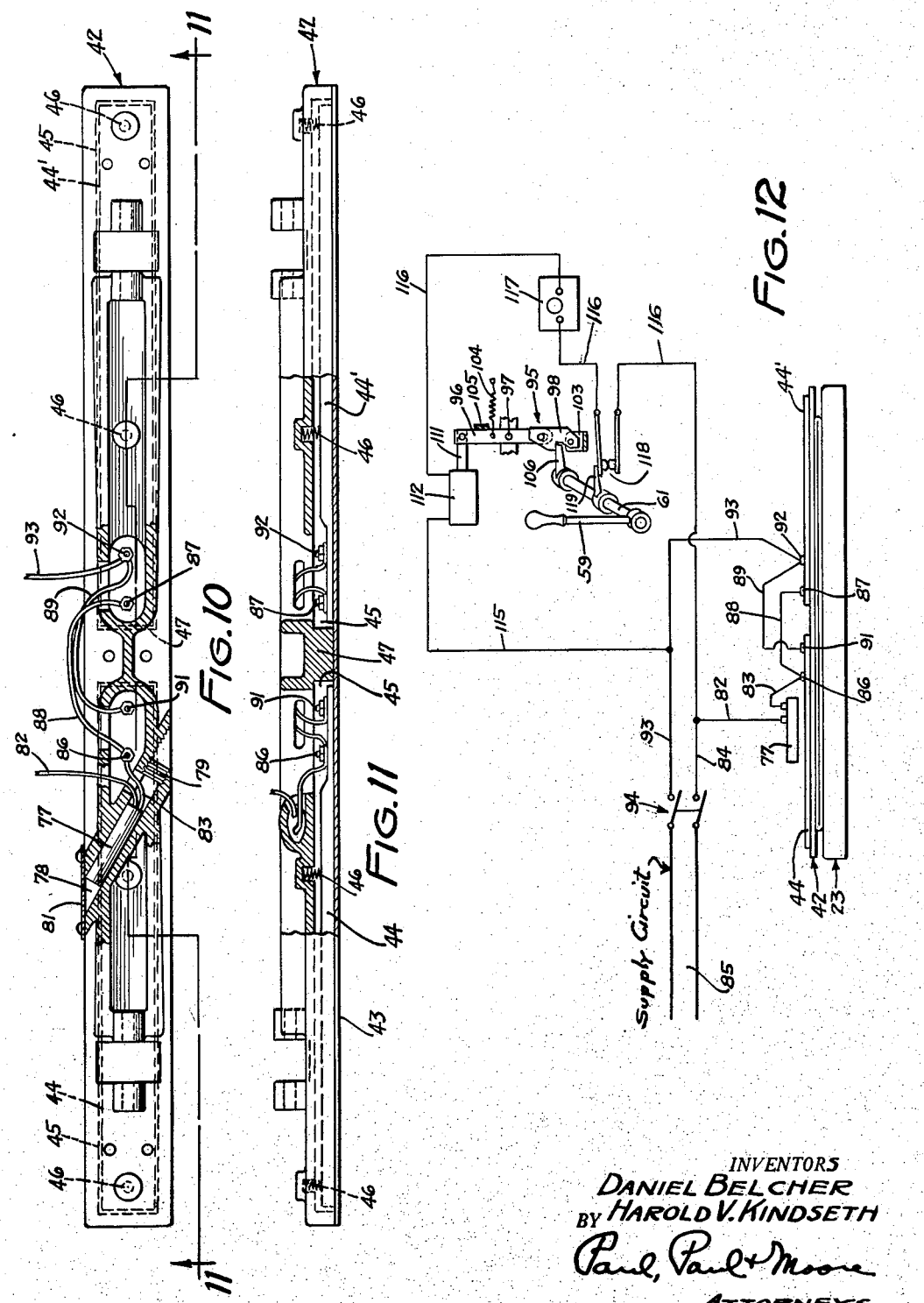

Patented Oct. 16, 1951

2,571,103

UNITED STATES PATENT OFFICE 2,571,103

BAG SEALING MACHINE

Daniel Belcher and Harold V. Kindseth, Minneapolis, Minn., assignors to Bemis Bro. Bag Company, Minneapolis, Minn., a corporation of Missouri Application October 29, 1948, Serial No. 57,168

13 Claims. (Cl. 226—56)

This invention relates to new and useful improvements in bag sealing machines, and more particularly to a manually operable machine for closing and sealing the open tops of large, flexible walled bags.

It is well known that many commodities are now packaged for shipment in large flexible walled bags, some weighing as much as one hundred pounds, when filled and sealed for shipment. The present machine is particularly adapted for hermetically bonding a strip of sealing tape to the flattened bag top walls by the application of heat and pressure, said sealing strip previously having been coated with a suitable heat sealable adhesive. There are now machines available upon the market for thus sealing the open tops of large flexible walled paper or textile bags, but to the best of our knowledge, these machines are quite expensive, as they usually include means for cutting, folding and applying the tape to the bag top walls, prior to securing it thereto by the application of heat and pressure, and as a result, they are usually power operated, and are designed more particularly for use in large milling plants, where large quantities of material may be packaged daily.

The present invention is more particularly directed to a simple and inexpensive machine which is particularly applicable for use in small milling and packaging plants, and is preferably adapted for manual operation, said machine being so constructed that it may be effectively and expeditiously operated by an inexperienced person with the assurance that all bag tops will be hermetically sealed against leakage, and will be uniform in appearance, and which does not fatigue the operator nor cause him to labor under tension, as when operating a machine which may require the operator to constantly exercise extreme care when operating the machine.

An important feature of the present invention therefore is to provide a manually operated bag top sealing machine which embodies few parts and which may be readily and effectively operated by an inexperienced operator.

A further object is to provide a machine of the class described having means for automatically controlling the length of the bag top sealing cycle, and whereby all bag tops will be uniformly sealed and will be alike in appearance.

A further object is to provide a bag top sealing machine comprising coacting jaws between which the flattened bag tops are successively fed, one wall of each bag top previously having had a strip of sealing tape applied thereto with approximately one-half of each sealing tape projecting above its respective bag top walls, said projecting tape portions being folded over the bag top walls and firmly pressed into sealing engagement with their respective bag top walls to effect a hermetically sealed closure, said machine having a thermostatically controlled element designed to operate after a predetermined time interval to release the jaws from the sealed bag top.

A further object is to provide a bag top sealing machine comprising a suitable supporting frame upon which the bag top clamping jaws and their operating means are supported, said frame being vertically adjustable to adapt the apparatus for handling bags of different heights.

A further and more specific object of the present invention is to provide a machine particularly applicable for use to effect the closing and sealing of bag tops, such as shown in the pending application of William J. Geimer, Ser. No. 623,583, filed October 20, 1945 (and which has since become abandoned), wherein a strip of sealing tape has previously been secured to one wall of each bag top and projects above its bag top walls in position to be folded over into bonding engagement with the opposed bag top wall and secured thereto by heat and pressure applied thereto by the jaws of the novel machine herein disclosed, the heat sealable bonding agent applied to one side of said tape having the inherent characteristic of becoming non-tacky when initially applied to the tape, whereby the empty bags may readily be handled in storage and during bag filling operations without danger of the adhesive of each half-attached tape adhering to objects with which it may contact prior to being folded into sealing and bonding engagement with the bag top walls in the final step of sealing the bag tops.

Other objects of the invention reside in the specific construction of the bag top clamping jaws and the manner in which they are operatively connected together; in the provision of an abutment rail in conjunction with one of said jaws for accurately aligning each bag top with the jaws; and in the provision of means for timing the duration of each sealing cycle and whereby the movable jaw is automatically released from clamping engagement with the fixed jaw after a predetermined time interval; and in the simple and inexpensive construction of the entire apparatus, whereby it may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 5 is a front view of the machine showing a bag positioned therein after the bag top has been sealed;

Figure 6 is a sectional plan view substantially on the line 6—6 of Figure 1;

Figure 7 is a detail sectional view on the line 7—7 of Figure 9;

Figure 10 is a plan view of the movable jaw detached from the machine, and showing the electrical connections for the heating elements and the thermostatic element for automatically controlling the temperature of the heating elements;

Figure 11 is a detail sectional view on the line 11—11 of Figure 10, showing the positions of the heating elements within the upper jaw; and Figure 12 is a schematic view showing the electrical connections between the various electrical elements of the control circuit.

Figure 1:
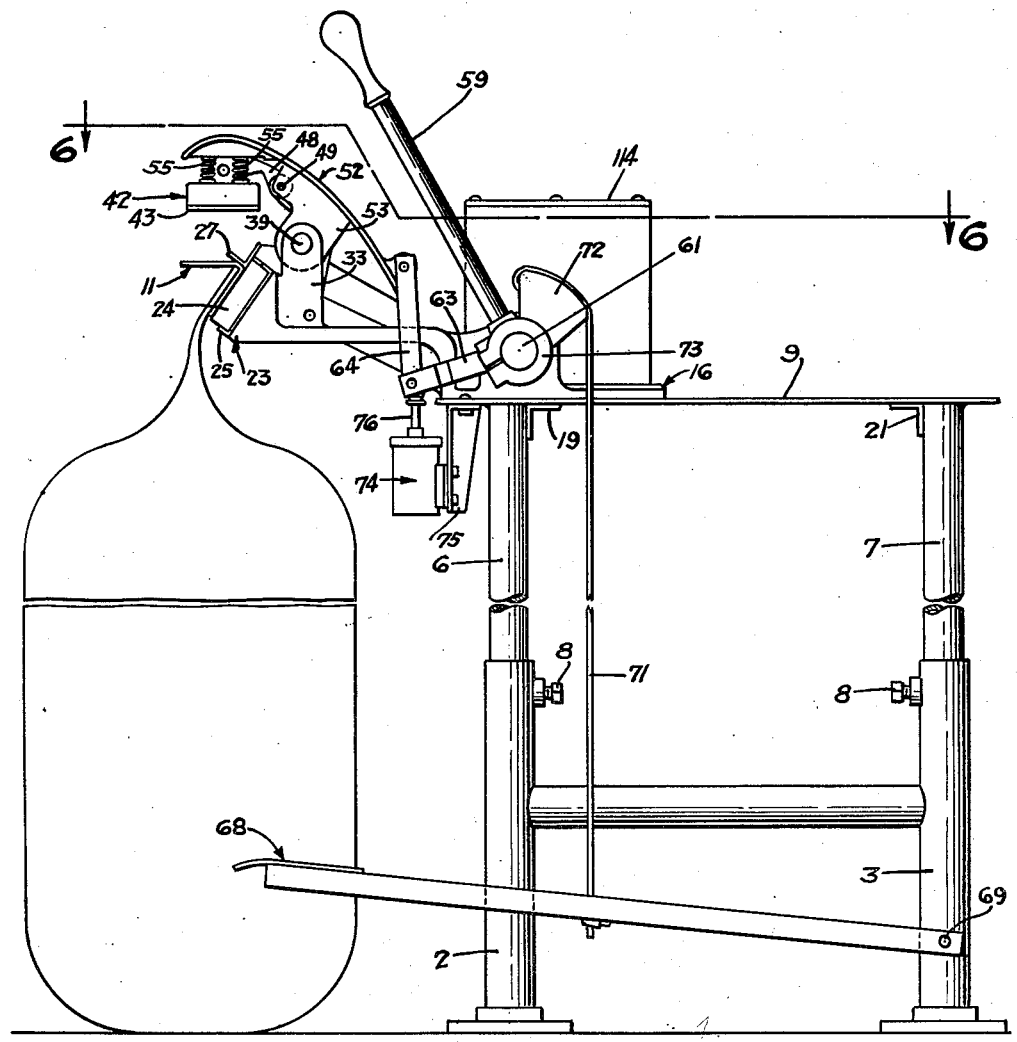
Figure 1 is a side elevation of the novel machine herein disclosed showing a bag top positioned against the fixed jaw, just prior to having its sealing tape pressed into sealing engagement with its exposed bag top wall.

The novel bag top sealing machine herein disclosed is shown comprising a suitable supporting frame, preferably constructed of tubular stock, but not necessarily. As best shown in Figures 1 and 5, the frame is preferably rectangular in form and comprises front and rear posts 2 and 3, respectively. The front posts 2 are shown tied together by a longitudinal frame member 4, and the rear posts 3 are tied together by a similar member 4. Tie members 5 are interposed between and secured to the posts 2 and 3 at each end of the frame, as clearly indicated by the full and dotted lines in Figures 1, 3 and 5.

Figure 2:
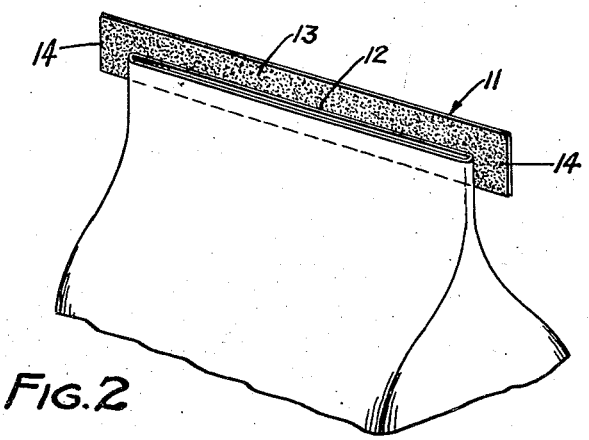
Figure 2 is a perspective view of a bag top showing a strip of sealing tape secured to a wall of the flattened bag top walls, as disclosed in the hereinbefore mentioned pending application.
Figure 3:
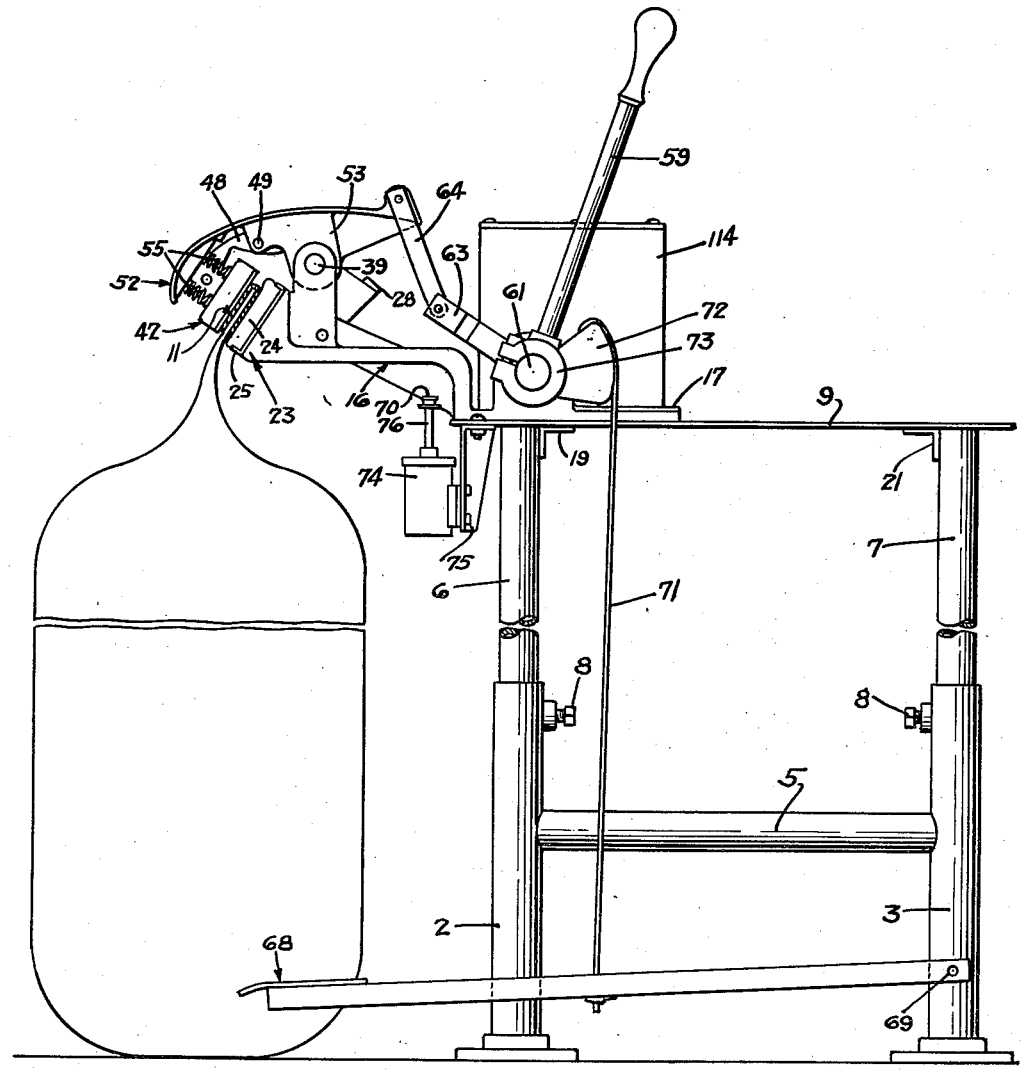
Figure 3 is a view similar to Figure 1, but showing the parts actuated to cause the jaws to grip the bag top.

Each corner post is preferably made of two sections, the front post sections 2 having upper sections 6 slidable therein, and the rear post sections 3 having upper post sections 7 slidable therein. The upper post sections 6 and 7 are thus vertically adjustable in their respective post sections 2 and 3, and may be secured in adjusted position by suitable clamping elements or screws 8, as shown in Figures 1 and 3. The upper post sections 6 and 7 are secured to a top plate 9 upon which the bag sealing mechanism, subsequently to be described, is mounted. The novel machine herein disclosed is particularly designed for sealing bag tops to one wall of which a strip of sealing tape has previously been secured, as illustrated in Figure 2.

Figure 4:
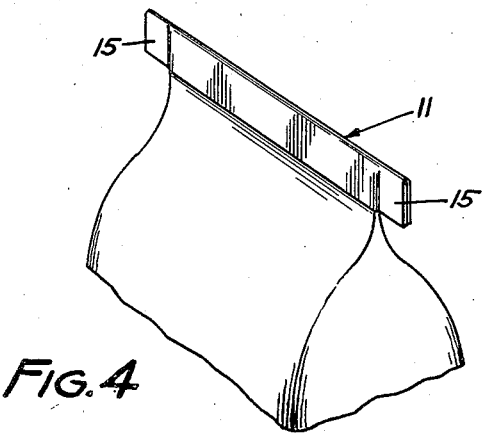
Figure 4 is a perspective view showing the sealing tape folded over the upper edges of the bag top walls and secured thereto to seal the bag top.

The sealing tape, indicated by the numeral 11, is shown bonded to one wall of the bag tops, for example, the rear wall 12, by a suitable heat sealable adhesive 13 having the inherent characteristic of becoming dry and non-tacky, whereby it may be handled without danger of the tape adhering to other bags or surfaces with which it may come in contact, when handling the empty bags. The tape, prior to being folded into sealing engagement with the bag top is flat, as shown in Figure 2, with its end portions 14 projecting beyond the ends of the bag top to provide ears 15 at the ends of the bag top, when the latter has been sealed as shown in Figure 4. Also by bonding the walls of the end portions 14 of the tape to one another, leakage from the ends of the bag top is positively eliminated, as will be understood.

The bag top sealing mechanism is shown comprising an elongated bracket, generally designated by the numeral 16. This bracket comprises a horizontally disposed portion 17 adapted to be seated upon the table top 9 and secured thereto by such means as bolts or screws 18, shown in Figure 6. Longitudinal frame members 19 and 21, preferably of angle iron cross section are shown secured to the upper ends of the upper post sections 6 and 7, respectively, and to the top plate 9, thereby to provide a substantial frame structure for supporting the operating mechanism of the bag top gripping means.

The bracket 16 has a portion 22 extending forwardly of the table top 9 and terminating at its forward end with a fixed jaw 23. A suitable resilient material 24, such as rubber, is preferably secured to the face of the jaw 24 by means of a channel member 25, secured to the face of the jaw 23 by suitable studs 26, best shown in Figure 8.

Figure 8:
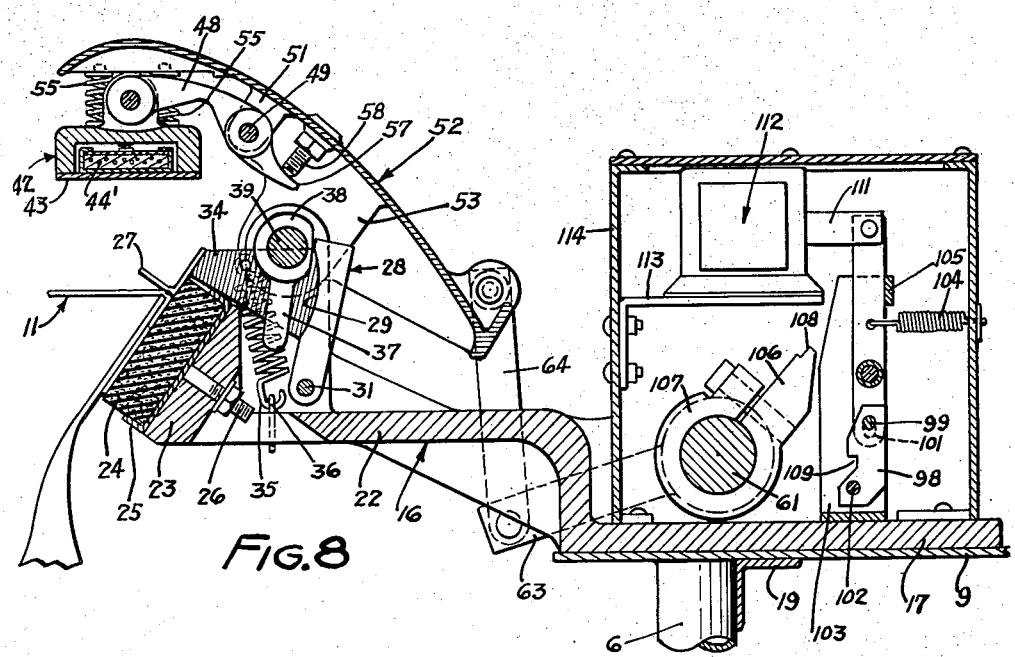
Figure 8 is a detail sectional view on the line 8—8 of Figures 6 and 7, on an enlarged scale, to more clearly illustrate the mounting of the jaws, and said jaws being shown in their normal open positions.
Figure 9:
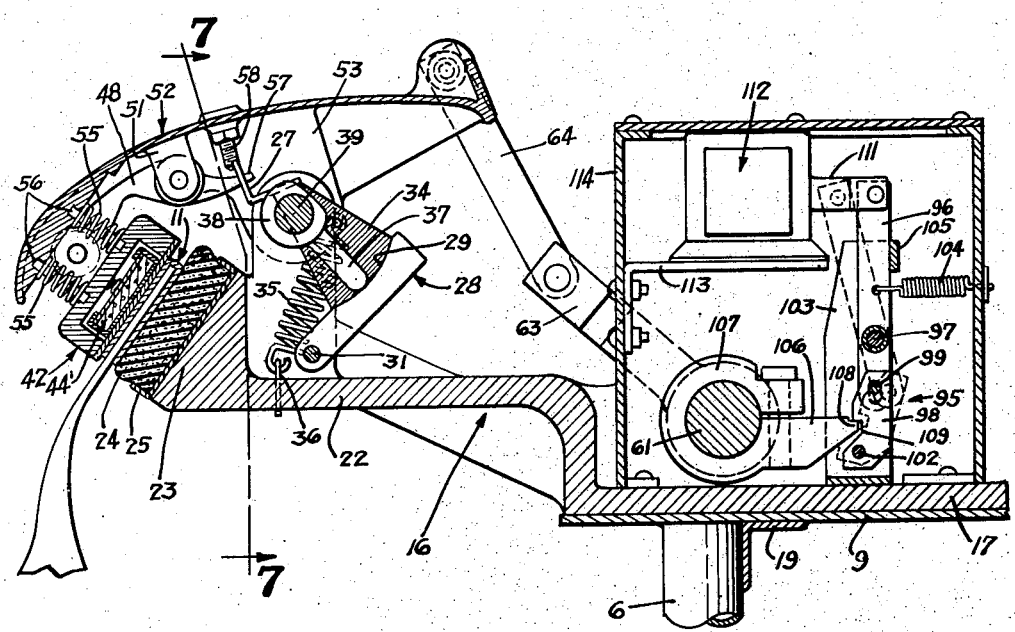
Figure 9 is a detail sectional view on the line 9—9 of Figure 5, showing the jaws actuated to grip a bag top.

Pivotally mounted over the upper portion of the lower jaw 23 is a stop bar 27, preferably of angle iron cross-section, and which partially overlies the cushion element of the lower jaw 23 when the jaws are in open position, as shown in Figure 8. When so positioned, the stop bar 27 serves as a stop to be engaged by each bag top to facilitate properly positioning each bag top upon the lower jaw 23, as will be clearly understood by reference to Figure 8. The stop bar has its end portions secured to a pair of supporting brackets or arms, generally designated by the numeral 28, and each provided with a cam surface 29, as best illustrated in Figures 8 and 9. The arms 28 are supported on pivots 31 mounted in the lower portions of spaced upright lugs 32 and 33, as indicated in dotted lines in Figure 7. The arms 28 are adapted for swinging movement between the positions shown in Figures 8 and 9, during each cycle of operation of the machine.

Spaced lugs 32 and 33 are provided at each end of the machine, as best illustrated in Figure 7, and the arms 28 are mounted adjacent to the inner lugs 32, as shown. Each arm 28 is shown having a forwardly extending web-like portion 34 to which the ends of the stop bar or tape folding means 27 are secured, as by welding, and whereby the arms 28 become in effect, an integral part of the stop bar 27.

Suitable springs 35 are shown each having one end secured to the overhanging portion 22 of the bracket 16 by suitable eyes 36, and have their opposite ends connected to the web-like portions 32 of the arms 28. The eyes 36 are so located relative to the pivots 31 that the springs 35 constantly tend to move the stop bar 27 into its operative position with respect to the lower jaw 23, shown in Figure 8.

The cam faces 29 of the arms 28 are adapted to be engaged by depending fingers 37, shown provided with hubs 38 mounted upon and secured to stub shafts 39 by such means as pins 41. The stub shafts 39 are mounted for rocking movement in suitable bearings provided in the upper extremity of the lugs 32 and 33, as best illustrated in Figure 7. Thus, when the upper jaw is moved into squeezing engagement with the bag top, as shown in Figure 9, the fingers 37 engage the cam surfaces 29 and swing the arms 28 and stop bar 27 into the positions shown in Figure 9, against the tension of the springs 35, and whereby the stop bar will be out of the way of the upper jaw 42.

The movable jaw is generally designated by the numeral 42, and comprises an elongated member, preferably of channel cross section, having a suitable plate 43 secured to the face thereof, as shown in Figure 8. Suitable heating elements 44 and 44' are mounted in the member 42, as perhaps best illustrated in Figure 11. The heating elements 44 and 44' are supported in recess 45 provided in the member 42 and the overall length of each heating element is substantially equal to the overall length of its respective recess 45, as clearly illustrated in Figure 11, whereby the heating elements 44 and 44' are supported against relative longitudinal movement.

Suitable spring elements 46 serve to hold the heating elements in heating contact with the face plate 43 of the upper jaw 42. The recesses 45 may be separated by a cross wall 47, as illustrated in dotted lines in Figure 10 and full lines in Figure 11.

The movable jaw 42 is mounted for relative pivotal movement on the ends of a pair of arms 48, mounted on pivots 49 supported in bearings 51 provided adjacent to the ends of an elongated plate-like member 52, having depending lugs 53 received between the upright lugs 32 and 33 of the bracket 22, and secured to the stub shafts 39 by suitable pins 54. See Figure 7. The upper jaw 42 is yieldably supported upon the members 52, whereby when moved into engagement with the bag top, as shown in Figure 9, the jaw 42 will yield relative to its supporting member 52.

To thus yieldably and pivotally support the upper jaw 42, a plurality of springs 55 are interposed between the upper face of the lower jaw 42 and the bottom side of the member 52, as clearly illustrated in Figure 9, the springs 55 being retained in position by short rods or pins 56 having their lower ends received in shallow recesses provided in the top surface of the jaw 42, and their upper ends being similarly received in recesses provided in the bottom face of the member 52. The arms 48 are provided with projecting end portions 57 normally engaged with adjusting screws 58 adjustably mounted in the member 52, as shown in Figure 8.

When the member 52 is actuated to bring the upper jaw 42 into position with a bag top positioned on the lower jaw 23 against the stop bar 27, the depending fingers 37 will engage the cam surfaces 29 simultaneously as the upper jaw is moved towards the bag top, whereby the arms 28 are swung rearwardly to thereby swing the stop bar out of the way of the movable jaw 42, as shown in Figure 9. The upper jaw then engages the unattached portion 13 of the sealing tape and presses it into sealing engagement with the adjacent bag top wall, and temporarily holds it in such position until the heated jaw 42 has reactivated the adhesive and caused it to intimately bond the walls of the sealing tape to the bag top walls. As the upper jaw 42 is pressed into sealing engagement with the lower jaw 42, the springs 55 are slightly compressed to thereby compensate for variations in the alignment of the coacting faces of the jaws 23 and 42, and for varying thicknesses in the bag top positioned between the jaws.

An operating lever 59 is shown secured to a longitudinally extending rock shaft 61 mounted in suitable bearings 62 provided on the bracket 16. Arms 63 are secured to the rock shaft 61 adjacent to its ends and have links 64 operatively connecting them to the member 52, whereby when the lever 59 is moved from the position shown in Figure 1 to the one shown in Figure 3, the upper jaw 42 is moved into bag sealing engagement with the lower jaw 23. Simultaneously the stop bar 27 is swung upwardly to the position shown in Figure 9. A suitable torsion spring 65 is shown coiled about the shaft 61 and has one end secured thereto by means of a collar 66. The opposite end of the spring 65 is secured to the bracket 16 by a suitable angle bracket 67, shown in Figure 6. The spring 65 constantly tends to rotate the shaft 61 in a counter-clockwise direction, when viewed as shown in Figure 1, thereby to return the upper jaw 42 to its normal inoperative position, shown in Figure 1.

A foot pedal 68 is shown having its rear end pivotally mounted on a pivot 69 located at the rear of the machine frame, as shown in Figures 1 and 3. A cable 71 has one end secured to the foot pedal 68 and its opposite end to a segment 72 provided on the hub 73 of the operating lever 59.

The rock shaft 61 is made symmetrical about the center of the machine whereby the operating lever 59 may be secured to either end thereof to accommodate either a right- or a left-hand operator. If desired, an operating handle may be provided at each end of the shaft 61 whereby the machine may be operated by either a right- or a left-hand operator without requiring that the handle be shifted from one end of the machine to the other.

A dash pot, generally designated by the numeral 74, is secured to a depending bracket 75 secured to the top plate 9, as shown in Figure 1. The dash pot has a piston therein provided with a rod 76 shown having a head 70 at its upper end adapted to be engaged by the adjacent arm 63, when the upper jaw is returned to its normal position by the action of the main spring 65. The dash pot serves to provide a cushioned stop for the arm 63 and acts as a shock absorber to protect the movable parts against sudden shocks, when the movable jaw is automatically released at the termination of the bag top sealing operation. The construction of the dash pot is well known and it therefore need not be shown and described in detail.

Means is provided for maintaining the heating elements 44 at a predetermined temperature and may consist of a thermostatic element 77 of conventional construction, shown mounted in a suitable bore 78 provided in the body of the upper jaw 42, as clearly illustrated in Figure 10. The lower end of the bore 78 may be closed with a plug 79 and its upper end with a plate 81, whereby the thermostatic element 77 may readily be removed from the bore 78, when necessary.

The thermostatic element 77 is shown provided with wires 82 and 83, the wire 82 being shown connected to a conductor 84 of an electric supply circuit 85, and the wire 83 being connected to a terminal 86 of the heating element 44. The terminal 86 is electrically connected to the terminal 87 of the heating element 44' by a wire 88, and a second wire 89 connects the terminals 91 and 92 of the heating elements 44 and 44', respectively, as shown in Figures 10 and 12. The terminal 92 of heating element 44' is connected by a wire 93 to the other side of the supply circuit 85, whereby the two heating elements are connected in parallel in the circuit. A suitable control switch 94 is preferably provided in the supply circuit 85, for shutting off the supply of current to the heating elements and the electrically operated control elements, when the apparatus is not in use.

Means is also provided for momentarily locking the movable jaw 42 in bag top sealing engagement with the lower jaw 23, as shown in Figure 9, to allow the jaw 42 ample time to thoroughly heat and reactivate the heat-sealable adhesive embodied in or applied to the sealing tape 11, whereby the walls of the tape may be intimately bonded to the walls of the bag top, it being understood that the cushion element 24 will yield or compress sufficiently to cause the walls of the projecting end portions 14 of the sealing tape to be brought into bonding engagement with one another to seal said ends, as will be understood by reference to Figure 4.

The means provided for thus temporarily locking the upper jaw 42 in bag top sealing engagement with the lower jaw 23, is shown comprising a toggle mechanism, generally designated by the numeral 95. The toggle mechanism comprises an operating arm 96 mounted for pivotal movement on a suitable pivot 97 and having its end portion below the pivot 97 pivotally connected to the upper end of a latch element 98 by a pin 99 fixedly secured in latch element 98. The pin 99 is received in a slot 101 provided in the lower end of the arm 96, to allow for swinging movements of the adjacent ends of the arm 96 and latch element 98, as indicated by the full and dotted lines in Figure 9. The latch element 98 is supported on a pivot 102 provided in the lower end of a bracket 103 shown secured to the horizontal portion 17 of the main supporting bracket 16. A spring 104 constantly holds the upper portion of the toggle arm 96 against a stop 105.

A latch arm 106 is shown provided with a split hub 107 whereby it may be adjustably secured to the rock shaft 61. The terminal 108 of the latch arm 106 is adapted to be received in a notch 109 in the latch element 98, as shown in Figure 9. When the upper jaw 42 is in bag top sealing engagement with the lower jaw 23, the toggle arm 95 is positioned against the stop 105, as shown in full lines in Figures 8 and 9. The upper end of the toggle arm 96 is connected to the armature 111 of a suitable solenoid, generally designated by the numeral 112 shown mounted on a bracket 113 secured to a wall of a suitable housing 114 mounted on the portion 17 of the main supporting bracket 16, and enclosing the toggle mechanism and associated parts. The solenoid 112 is electrically connected to the wires 115 and 116 of the control circuit.

Means is provided for automatically timing the duration of the bag top sealing operation, and is shown comprising a suitable timer 117 electrically connected in the wire 116. A suitable cutout switch 118 is also connected in the wire 116 and is normally in circuit-opening position when the machine is at rest.

The timer 117 is of well known construction and therefore need not be described in detail. It is so constructed that when the switch 118 is open, as when the machine is at rest, the timer conditions the control circuit for operation. It may be manually set to interrupt the squeezing operation of the jaws at any point throughout the length of its working cycle, and when the time interval at which the timer may be set expires, the timer automatically opens the control circuit and thereby interrupts the supply of current to the solenoid 112, causing the solenoid to become de-energized whereupon the usual spring provided therein (not shown) will instantly swing the toggle arm 96 from the full to the dotted line position shown in Figure 9, thereby effecting the release of the latch arm 106, whereupon the spring 65 will restore the movable jaw 42 to its inoperative position shown in Figure 8. The instant the solenoid is de-energized to effect the release of the rock shaft 61, the switch 118 is automatically opened and the timer 117 automatically restored to its normal circuit-conditioning or starting position in preparation for the next cycle of operation.

When it is desired to seal a bag top, the bag top is positioned on the resilient element 24 of the lower jaw 23 with the upper folded portion of the sealing strip 11 engaging the stop bar or tape folding member 27, in such a manner that it will be partially folded as shown in Figure 8. The operator then depresses the foot pedal or manipulates the lever 59, to threeby rock the shaft 61 in a clockwise direction, when moved as shown in Figure 1, whereby the upper jaw 42 is moved into engagement with the free flap or wall portion 13 of the sealing strip, and presses it into bonding contact with the adjacent bag top wall by a yielding and squeezing pressure, as will be understood by reference to Figure 9. When the rock shaft 61 is initially actuated upon initial starting of the machine, a finger 119 secured to the shaft 61 (see Figure 12), engages one of the contacts of the switch 118 and closes said switch whereby the control circuit is closed and instantly energizes the solenoid 112 and the timer 117, assuming, of course, that the main control switch 94 has previously been closed.

For example, assuming the bag top to be sealed requires that it be held between the jaws 23 and 42 for a period of ten seconds in order to thoroughly and completely reactivate the adhesive to effect an intimate bond between the walls of the tape and the bag top, the timer is adjusted to an operating period of ten seconds and the operator then places the bag top between the jaws against the stop bar 27, and at the same time depresses the foot pedal 88. This causes the finger 119 on the rock shaft 61 to close the switch 118 of the control circuit, whereupon the solenoid 112 is energized and instantly restores the toggle arm 96 to the full line position shown in Figure 9, whereby the latch member 95 will engage the terminal of the latch arm 106 and temporarily lock the movable jaw 42 in sealing engagement with the bag top, as illustrated in Figure 9.

At the termination of the ten second operating interval at which the timer 117 has previously been set, the control circuit is automatically opened by the timer 117, thereby de-energizing the solenoid 112 and causing the toggle mechanism 95 to release the rock shaft 61, whereupon the upper jaw is restored to its normal position shown in Figure 8. Simultaneously, the stop bar 27 is returned to its operative position over the stationary jaw 23, as shown in Figure 8, by reason of the finger 37 moving out of engagement with the cam face 29 of the arm 28.

The heating elements 44 and 44' are preferably so connected in the circuit that they will function whenever the control switch 94 of the supply circuit is closed, the thermostatic element 77 preventing overheating of the heating elements whereby they may be left on indefinitely without danger of becoming damaged from excessive heat.

The novel apparatus herein disclosed has been found extremely practical and efficient for expeditiously completing the closing and sealing of bags having a strip of sealing tape secured to one wall of each bag top, as shown in Figure 2. The resilient mounting of the upper jaw 42 cooperates with the resilient pad 24 of the lower jaw 23 to completely squeeze the walls of the tape and bag top into intimate bonding engagement with each other, including the contiguous walls of the projecting tape ends 15. The stop member 27 which automatically shifts into and out of operative position over the lower jaw 23, greatly facilitates the operation of placing the bag tops in proper position upon the cushion element 24 of the lower jaw 23, whereby all of the bag tops will be uniform in appearance.

The timer provides means whereby the time interval required to assure complete and thorough reactivation of the adhesive may readily and conveniently be varied in accordance with the characteristics of the heat sealable adhesives used in the construction of different bags. Thus the operator is assured at all times that all bag tops of a given run of bags being closed and sealed by the machine will receive identical treatments by the jaws 23 and 42.

The machine is extremely simple in construction and operation and readily lends itself for sealing the tops of bags of varying sizes. While we have herein shown and described the machine as used for sealing bag tops having a strip of sealing tape half attached thereto, it is conceivable that the apparatus may be used for sealing bag tops which have not previously had a strip of sealing tape secured to one wall, or one-half of the perimeter of the open bag tops.

It will be apparent to those skilled in the art that we have accomplished at least the principal objects of our invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. In a machine for closing and sealing bag tops by adhering a strip of sealing tape to the flattened bag top walls, a support, complemental jaws mounted on said support and normally in open position to permit a flattened bag top to be inserted therebetween, a movable bag top positioning member adjacent to one of said jaws, when the machine is at rest, means for causing the jaws to engage the bag top and firmly press a strip of sealing tape into bonding engagement with the walls of the bag top with a squeezing action, and simultaneously effecting removal of said member from between said jaws, and means for momentarily retaining the jaws in pressing engagement with the tape and bag top walls to allow the adhesive to set.

2. In a machine for closing and sealing bag tops each having a strip of sealing tape attached to the marginal edge of a wall of each bag top with its unattached portion projecting beyond the bag top with a portion of the tape projecting beyond the end of the bag top, a support, complemental jaws mounted on said support and normally in open position to permit a flattened bag top to be inserted therebetween, means movably mounting an elongated member positioned adjacent to one of said jaws, when the machine is at rest, adapted to be engaged by the unattached projecting portion of the tape and to partially fold said tape portion over the flattened bag top walls, said elongated member also facilitating positioning the bag top between the jaws, means for causing said jaws to engage the sealing tape and press it firmly into bonding engagement with the bag top walls to adhere it thereto, and means, including an actuating element mounted adjacent one of said jaws made operable by initial movement of the jaws to automatically move said elongated member out of the path of the jaws to permit said jaws to grip the bag top.

3. In a machine for closing and sealing bag tops each having a strip of sealing tape attached to one wall of the flattened bag top by a suitable adhesive, a support, a stationary jaw mounted thereon, a movable jaw normally spaced from the fixed jaw to permit a bag top to be inserted between said jaws, means movably mounting a stop member adjacent the lower jaw for positioning the bag top thereon, and means, including an actuating element movably mounted on said support for moving the stop member out of the path of the movable jaw, when said movable jaw is moved into squeezing engagement with the bag top to secure the strip of sealing tape thereto.

4. In a machine of the class described for closing and sealing bag tops having a strip of sealing tape attached to a wall of the bag top by a heat sealable adhesive, a support, a stationary jaw mounted thereon, a movable jaw normally spaced from the fixed jaw to permit a bag top to be inserted between said jaws, means movably mounting a stop member across the face of the fixed jaw for positioning the bag top thereon, means for heating one of said jaws, means, including an actuating element mounted adjacent said stationary jaw for moving the stop member out of the path of the movable jaw, when the latter is moved into squeezing engagement with the bag top to secure the strip of sealing tape thereto, and means for retaining the jaws in squeezing contact with the tape and bag top walls for a predetermined time interval.

5. In a machine for closing and sealing bag tops each having a strip of sealing tape attached to a wall of the flattened bag top by a suitable heat sealable adhesive, and having substantially one-half of its width unattached to the bag top and projecting beyond the top edges of the bag top walls, a support, a stationary jaw mounted thereon, means movably mounting a stop member adjacent to said jaw and normally overlying a longitudinal edge portion thereof and against which each bag top is positioned to facilitate squaring the bag tops with the jaw, a movable jaw normally spaced from the fixed jaw and having means therein for heating its bag engaging face, means for moving the movable jaw into engagement with a bag top positioned on the fixed jaw to firmly press the unattached portion of the sealing tape into intimate contact with the adjacent bag top wall, means, including an actuating arm connected to said stop member made operable by actuation of the movable jaw to move the stop member out of the path thereof, said stop member being automatically returned to its operative position over the fixed jaw when the movable jaw is returned to its normal open position, and means for temporarily retaining the movable jaw in squeezing engagement with the bag top to permit the adhesive to become reactivated to thereby effect a thorough and intimate bond between the walls of the bag top and sealing tape.

6. In a machine for closing and sealing flattened bag tops each having a strip of heat sealable sealing tape attached to a wall thereof and whereby substantially one-half the width of the tape is unattached and projects beyond the end of the flattened bag top, a support, a pair of jaws mounted on said support, one of said jaws being stationary and the other movable, means for heating one of said jaws, means movably mounting a stop member normally positioned over a portion of the fixed jaw to facilitate squaring each bag top with said jaw, means for swinging the movable jaw into squeezing engagement with the unattached portion of the tape and pressing it into sealing engagement with the adjacent bag top wall, means, including an actuating element connected to said means for swinging said movable jaw and cooperatively associated with said stop member to move the stop member out of the path thereof, said stop member returning to its operative position over the fixed jaw when the movable jaw returns to its normal open position, a toggle mechanism for temporarily retaining the movable jaw in engagement with the bag top to permit thorough and complete reactivation of the adhesive to hermetically seal the bag top, and a timing mechanism for automatically actuating the toggle mechanism to release the movable jaw after a predetermined time interval.

7. A machine according to claim 6 further characterized in that the bag top engaging faces of the jaw are yieldable whereby a uniform pressure is exerted on the tape and bag top walls the length of the tape and regardless of variations in the thickness of each sealed bag top.

8. A machine according to claim 6 further characterized in that electrical means is provided for automatically causing said toggle mechanism to operate and release said movable jaw after a predetermined time interval.

9. In a machine for completing the closing and sealing of flattened bag tops each having a strip of heat sealable sealing tape attached to a wall thereof and whereby substantially one-half the width of the tape is unattached and projects beyond the end of the flattened bag top, a pair of jaws normally in open position to permit a flattened bag top to be inserted therebetween, means movably mounting a longitudinally extending stop member normally positioned over the marginal edge portion of one of said jaws, a spring-actuated support for said stop bar constantly urging it into operative position over its complemental jaw, operating means for causing said jaws to engage a flattened bag top positioned between said jaws against said stop bar, thereby to press the unattached wall of the sealing tape into bonding engagement with an adjacent wall of the bag top, means, including an actuating element mounted adjacent said spring actuated support made operative by movement of said jaws into squeezing engagement with the bag top to cause said stop member to swing out of the path of said jaws to permit the jaws to engage the sealing tape and bag top, heating means in at least one of said jaws for reactivating the adhesive applied to the sealing tape, when the jaws are in bag top squeezing engagement with the tape and bag top walls, and means for temporarily retaining the jaws in squeezing engagement with the bag top to allow the adhesive ample time to become thoroughly and completely reactivated to effect a leak-proof closure.

10. In a machine for completing the closing and sealing of bag tops each having a strip of heat sealable sealing tape attached to a wall thereof with a portion of the tape being unattached and projecting beyond the top end of the bag top, a frame, a jaw mounted in fixed relation on said frame, a movable jaw, a support for said movable jaw mounted for rockable movement on the frame and yieldably supporting said jaw, an electric heating element in at least one of said jaws, a rock shaft having an operative connection with said rockable support, an operating member for imparting rocking movement to the rock shaft to actuate said support and cause the movable jaw to move into engagement with a bag top positioned on the fixed jaw, thereby to firmly press walls of the bag top and sealing tape into bonding engagement with one another, means movably mounted adjacent said fixed jaw for squaring each bag top to said jaws to assure uniform bag closure, means for momentarily locking the rock shaft in bag top pressing position to allow ample time for the adhesive to become reactivated to effect an intimate bond between the tape and bag top walls, and electrical means for automatically effecting the release of the rock shaft after a predetermined time interval whereupon the parts, including the movable jaw and the operating member, are returned to their normal position to complete the bag top sealing cycle.

11. A machine according to claim 10, further characterized in that the locking means for the rock shaft comprises an electrically controlled toggle mechanism.

12. A machine according to claim 10, further characterized in that a timer is interconnected in the electric control circuit for the toggle mechanism having means for varying the duration of the bag top sealing cycle.

13. In a machine for completing the closing and sealing of bag tops each having a strip of heat sealable sealing tape attached to a wall thereof with a portion of the tape being unattached and projecting beyond the bag top walls, a fixed jaw having a cushioning element secured to its bag top engaging face, a movable jaw, a member mounted for pivotal movement and yieldably supporting said movable jaw, electric heating means in at least one of said jaws, a rock shaft having an operative connection with said member, an operating member for imparting rocking movement to said shaft to actuate said member to cause the movable jaw to firmly press the bag top and sealing tape into engagement with the fixed jaw, a toggle mechanism comprising a latch element, a latch arm secured to the rock shaft and so positioned thereon that when the rock shaft is actuated to move the movable jaw into engagement with the fixed jaw, the latch arm is moved into locking engagement with the latch element of the toggle mechanism, thereby to lock the movable jaw in squeezing engagement with the bag top, a solenoid for actuating the toggle mechanism, a timer for controlling the duration of the bag top squeezing operation of said jaws and whereby the duration of the squeezing and pressing operation may be varied in accordance with the time required to reactivate various adhesives used in the construction of different bags, a control circuit for the solenoid and timer connected to an electric supply circuit, normally open cutout switch in the control circuit and means on the rock shaft for closing the cutout switch to effect energization of the solenoid and timer, when the rock shaft is actuated to move the movable jaw into squeezing engagement with the bag top, said timer momentarily opening the control circuit after a predetermined time interval thereby to de-energize the solenoid and cause the toggle mechanism to operate and release the rock shaft, whereby the movable jaw returns to its normal open position.

DANIEL BELCHER.
HAROLD V. KINDSETH.

REFERENCES CITED

The following references are of record in the file of this patent:

UNITED STATES PATENTS

| Number | Name | Date |
|---|---|---|
| 2,166,761 | Kohl | July 18, 1939 |
| 2,188,039 | Farmer | Jan. 23, 1940 |
| 2,244,282 | Bergstein | June 3, 1941 |
| 2,252,105 | Waters | Aug. 12, 1941 |
| 2,395,387 | Fry et al. | Feb. 26, 1946 |
| 2,401,991 | Walton et al. | June 11, 1946 |